US012116062B2

(12) United States Patent
Kuehner et al.

(10) Patent No.: US 12,116,062 B2
(45) Date of Patent: Oct. 15, 2024

(54) SYSTEM AND METHOD FOR PROVIDING A CENTER INDICATOR FOR A TEMPORARILY DECOUPLED STEERING WHEEL

(71) Applicant: TOYOTA RESEARCH INSTITUTE, INC., Los Altos, CA (US)

(72) Inventors: Manuel Ludwig Kuehner, Mountain View, CA (US); Hiroshi Yasuda, San Francisco, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 289 days.

(21) Appl. No.: 17/690,254

(22) Filed: Mar. 9, 2022

(65) Prior Publication Data
US 2023/0286576 A1 Sep. 14, 2023

(51) Int. Cl.
*B62D 6/00* (2006.01)
*B60Q 3/283* (2017.01)
*B62D 1/04* (2006.01)

(52) U.S. Cl.
CPC ............. *B62D 6/008* (2013.01); *B60Q 3/283* (2017.02); *B62D 1/046* (2013.01)

(58) Field of Classification Search
CPC ......... B62D 6/008; B62D 1/046; B60Q 3/283
See application file for complete search history.

(56) References Cited

U.S. PATENT DOCUMENTS 5,666,102 A 9/1997 Lahiff
6,253,131 B1 * 6/2001 Quigley ............... B60R 16/027
340/461
(Continued)

FOREIGN PATENT DOCUMENTS

CN 207141176 U 3/2018
DE 102016221853 A1 5/2018

OTHER PUBLICATIONS

Sandyeggo Designs LLC, "Steering Wheel Top Center Marker," Sandyeggo Designs (https://www.sandyeggodesigns.com/product/steering-wheel-top-center-marker/), 2 pgs., 2016.
(Continued)

*Primary Examiner* — Gertrude Arthur Jeanglaude
(74) *Attorney, Agent, or Firm* — SHEPPARD, MULLIN, RICHTER & HAMPTON LLP; Daniel N. Yannuzzi

(57) ABSTRACT

A system is provided for implementing steering wheel controls, namely a center indicator on a decouplable steering wheel that is visible to the driver. The center indication controls provide a center indicator for a temporarily decouplable steering wheel, where the center indicator is visibly generated on the steering wheel. A system includes center indicator devices that are disposed along a perimeter on a steering wheel. A controller determines a position on the steering wheel that corresponds to a center position, and selects one of the plurality of center indicator devices at the determined center position on the steering wheel. The selected center indicator device produces feedback to the driver to indicate the center position on the steering wheel. Feedback from the center indicator allows drivers to be better aware of the steering wheel's position and to make safe and/or accurate maneuvers until the steering wheel is properly recoupled.

19 Claims, 9 Drawing Sheets

(56) References Cited

U.S. PATENT DOCUMENTS

| | | | |
|---|---|---|---|
| 9,421,993 B2* | 8/2016 | Spaggiari | B60Q 1/343 |
| 9,567,008 B2 | 2/2017 | Eichhorn | |
| 10,730,431 B2 | 8/2020 | Marc | |
| 10,780,908 B2 | 9/2020 | Gardner | |
| 2008/0061954 A1 | 3/2008 | Kulas | |
| 2011/0187518 A1* | 8/2011 | Strumolo | B62D 15/029 |
| | | | 340/438 |
| 2016/0039456 A1* | 2/2016 | Lavoie | B62D 15/027 |
| | | | 701/41 |
| 2019/0016383 A1 | 1/2019 | Spencer | |
| 2020/0089226 A1 | 3/2020 | Breisinger | |

OTHER PUBLICATIONS

Axon, "Axon's Automotive Anorak—The 12 Best Steering Wheels Ever," Goodwood Road & Racing. Sep. 14, 2020 (https://www.goodwood.com/grr/road/news/2017/10/axons-automotive-anorak--the-13-best-steering-wheels-ever/), 10 pgs.

* cited by examiner

SYSTEM AND METHOD FOR PROVIDING A CENTER INDICATOR FOR A TEMPORARILY DECOUPLED STEERING WHEEL

TECHNICAL FIELD

The present disclosure relates generally to computer-controlled vehicle safety technology. In particular, various embodiments describe a vehicle that includes the capability to provide computer-controlled steering wheel controls, such as automatic indicators that represent a center position of a steering wheel, as an enhanced safety control feature.

DESCRIPTION OF RELATED ART

Vehicle accidents (e.g., collisions) are a constant threat to drivers, passengers, pedestrians and property. Accidents, which unfortunately result in injury, in some instances, may be caused by the driver. For instance, "driver caused" accidents may be attributed to: a delay in a driver's recognition of a hazardous situation, the driver ability to react accordingly to a hazardous situation, and/or unknowingly maneuvering the vehicle in a manner that is extremely unsafe in the current conditions of the vehicle, road, and/or surroundings. According to NHTSA, there were over 7.2 million reported car accidents in 2016—many of which were avoidable. It may be beneficial to equip vehicles with mechanisms that provide steering wheel controls and/or feedback that can improve safety and/or reacts in a manner that promotes safety (e.g., collision prevention), in order to help protect drivers, passengers, people in other vehicles on the road, and pedestrians from harm.

BRIEF SUMMARY OF THE DISCLOSURE

In accordance with embodiments of the disclosed technology, methods and systems for generating steering wheel controls, namely center indication controls, are implemented in a vehicle which generate a center indicator on a decouplable steering wheel that are visible to the driver. As disclosed herein, the center indication controls provides a center indicator for a temporarily decouplable steering wheel, where the center indicator is visibly generated on the steering wheel itself in a manner that is easily seen and recognizable to the vehicle's driver. The embodiments thereby provide feedback to the driver, which allows the driver to be better aware of the steering wheel's position and to make safe and/or accurate maneuvers until the steering wheel is properly recoupled. Particularly, the center indicator controls are configured to provide the driver of the vehicle an accurate and interpretable (e.g., visible) indication of where the center position (e.g., also referred to herein as the 12 o'clock position) of the steering wheel is located, wherein respect to the steering wheel's angular position. The center indication controls, as disclosed herein, operate by computing a position of the steering wheel that corresponds to the center, or 12 o'clock position, with respect to the wheel alignment, and then triggering visual indication devices, such as Light Emitting Diodes (LED) that may integrated within the steering wheel (or steering wheel assembly), to illuminate at a particular location on the steering wheel that corresponds to the determined center of the steering wheel. This capability to indicate the center position of the steering wheel is particularly useful in the case where the steering wheel has been temporarily decoupled from the steering rack.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Some vehicles include computer-controlled operational modes, such as vehicles having adaptive cruise control mode and automated vehicles, in which a computing system is used to navigate and/or maneuver the vehicle along a travel route. Furthermore, vehicles can include advancements and innovations in safety that help prevent crashes and protect people. For example, some vehicles are equipped with technology, such as computer-controlled vehicle safety systems, that are designed to support driver awareness, decision making and vehicle operation over a wide range of speeds. There are vehicle safety systems that provide features which help address several key areas of accident protection: preventing or mitigating frontal collisions (e.g., collision detection), keeping drivers within their lane (e.g., lane departure alert), and enhancing road safety during nighttime driving (e.g., automatic high beams). Moreover, the disclosed embodiments implement center indicator controls (e.g., operating in connection with steering wheel decoupling functions of the vehicle's safety features), in order to generate an indication of a new center position of the steering wheel that is visible to the driver in a manner that further improves safety and ease of steering for the driver in operation.

Figure 1:
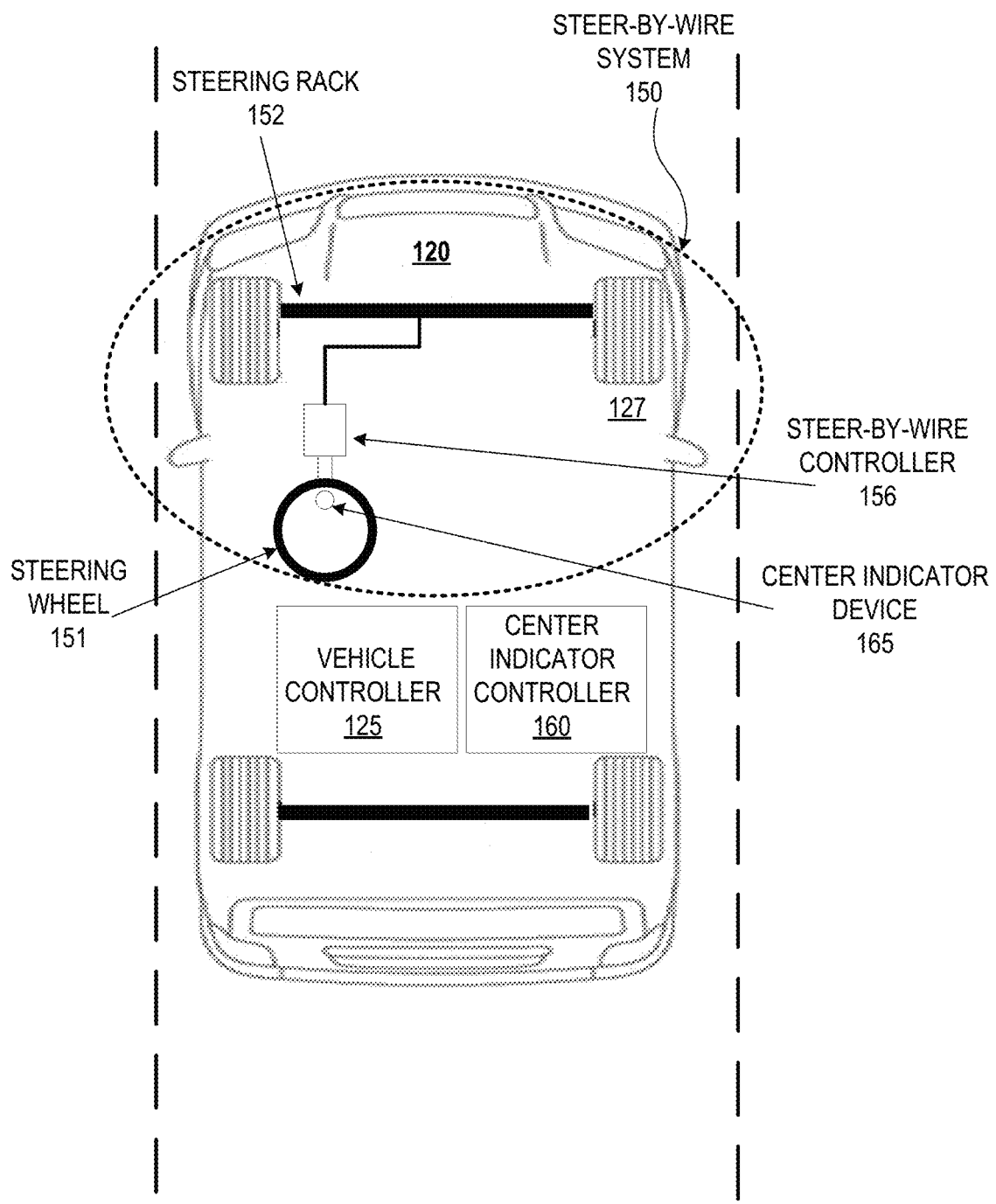
FIG. 1 is an example road environment including a vehicle utilizing a center indicator control system, in accordance with an embodiment of the technology disclosed herein.

Referring now to FIG. 1, an example of a road environment 100 is depicted, which includes a vehicle 120 that is configured to implement the center indicator controls system, as disclosed herein. As seen in FIG. 1, the vehicle 120 can include a vehicle controller 125, which enables various functions and/or controls other components of the vehicle 120. In particular, vehicle controller 125 can be configured to perform various computer-controlled operational modes, such as safety features (e.g., collision avoidance), autonomous driving operations, and semiautonomous driving operations. In some embodiments, the vehicle controller 125 is configured to be communicatively coupled with the disclosed center indicator controller 160 in order to support its functions, as described herein. Further, the vehicle 120 is depicted as including a steer-by-wire system 150 (represented in FIG. 1 by dashed oval), which allows the steering wheel 151 to be decouplable, as will be described in greater detail herein.

As illustrated in FIG. 1, the steer-by-wire system 150 of vehicle 120 can consist of: a steering wheel 151 which receives input from a driver to steer the vehicle 120 and having an actuator (not shown) for movement; a steering rack 152 also having actuator (not shown) for movement; and a steer-by-wire controller 153 that implements the various software functions that control the steering capabilities for the system 150. As a general description, the steer-by-wire system 150 enables both manual driving (e.g., maneuvering and/or steering controller by the driver) and autonomous driving (e.g., computer-controlled maneuvering and/or steering), and further replaces the previously used mechanical/physical connection between the steering wheel 121 and the wheels 127 of the vehicle 120 with electronic controls, by using electrically controlled motors (referring to herein as actuators) to change the direction of the wheels 127 and to provide feedback to the driver. By utilizing the steer-by-wire system 150, the vehicle 120 has an electronic (or "by-wire") connection between the steering wheel 151 and the wheels 127 (rather than a mechanical connection), thereby eliminating use of traditional mechanical components such as the intermediate shaft, steering column, and the like, which are used in conventional mechanical-based steering assemblies.

The steering wheel's 151 actuator generates the steering feel and passes the driver's steering signal "by-wire" quickly and precisely to the actuator of the steering rack 152, which in turn, steers the wheels 127, depending on the driving speed and conditions. The steer-by-wire system's 150 functions (e.g., controlling actuators, signals, steering) are controlled by the by controller 156, which implements the software elements designed to govern the sophisticated steering technology. The steer-by-wire system 150 can also enables a wide range of technical features for more safety, comfort and agility that were not possible with conventional steering systems. In some embodiments, the steer-by-wire controller 156 is configured to be communicatively coupled with the disclosed center indicator controller 160 to support the functions as described herein. It should be appreciated that implementation in a vehicle utilizing steer-by-wire for steering control, as described herein, is not intended to be limiting. Accordingly, the disclosed center indicator control system and functions can be implemented in vehicles using other forms of steering control mechanisms and assemblies.

As an operational example, suppose the vehicle 120 is performing an autonomous (or semiautonomous) evasive maneuver. For instance, while the vehicle 120 is being driven on the roadway, the vehicle 120 could be approaching a preceding vehicle in the same lane at an extremely high and unsafe acceleration rate. As a result, a safety system of the vehicle 120, such as collision avoidance, can utilize the vehicle controller 125 to begin computer-controlled driving, which takes control of the vehicle 120 from the driver and maneuvers, at least temporarily, in the computer-controller operational mode to avoid a collision. In that case, while in the computer-controller operational mode (e.g., autonomous maneuvering the vehicle), the safety system of the vehicle 120 may also temporarily decouple the steering wheel 151 from the steering rack 152, allowing the wheels 127 of the vehicle 120 to move independently of the steering wheel 151 and vice versa. That is, the steering wheel 151 can be considered coupled when the operation of the steering wheel 151 and its control of the wheels 127 mimics that of a mechanical steering connection. For example, when the steering wheel 151 is coupled (or recoupled), the driver turning the steering wheel 151 to the right at a certain angle causes the wheels 127 to also turn to the right at an associated angle. In contrast, when the steering wheel 151 is decoupled, the driver may turn the steering wheel 151 to the right, but the operation may not mimic that of a direct mechanical connection, as the wheels 127 may not similarly turn to the right or have any movement that is related to the input position of the steering wheel 151.

Decoupling the steering wheel 151 from the steering rack 152 may be a software-driven function that is supported by the steer-by-wire controller 156, which is performed automatically in response to initiating a computer-controller operational mode, in some cases. By decoupling the steering wheel 151, in the event that the driver panics and tries to abruptly steer the vehicle 120 in the middle of the vehicle 120 autonomously performing its evasive maneuver, for example, the driver's input from the steering wheel 151 will not affect any movement of the wheels 127. In other words, disruptive input to the steering wheel 151, which could potentially cause the vehicle 120 to move in an unintended and dangerous manner while it its operating autonomously (e.g., under control of the vehicle controller 125) can be circumvented by decoupling the steering wheel 151.

Once the computer-controlled vehicle operation, such as the autonomous evasion maneuver, has been completed, the safety system may recouple the steering wheel 151 to the steering rack 152. However, because there was independent movement of the steering wheel 151 and the steering rack 152 during the time period when the vehicle 120 was under the computer-controlled operation, the recoupling of the steering wheel 151 to the steering rack 152 may result in a steering wheel 151 that is off-center when the wheels 127 of the vehicle 120 are pointed straight forward (i.e., 0° steer angle). Accordingly, the disclosed center indicator control system provides an indication of a new center position of the steering wheel that is visible to the driver, for improved safety and more precise steering while driving.

As referred to herein, the term "center" of the steering wheel is a position that is determined with respect to the orientation of the wheels 151 of the vehicle 120, as opposed to the movement of the vehicle 120 or the position of the steering wheel itself. For example, the vehicle 120 may be traveling on an icy road (or a road with a slippery surface due to other weather/conditions that can affect traction of the tires) where the driver is steering the wheels 127 to be "centered." However, do to accelerative forces (e.g., vehicle already moving to the right/left direction) and the loss of the tires' grip on the road's icy surface, the vehicle 120 may slide and continue to move in a direction that is not consistent to the "center" orientation of the tires. In other words, the driver may straighten the wheels 127 to the "center" position, but the loss of traction leads to the vehicle 120 sliding on the ice, and the vehicle 120 will be moving to the left or right, even while the wheels 127 (and steering wheel 151) are "centered." The "center" of the steering wheel 151 is the position that corresponds to the middle point (or center) of the wheels' 127 angular radius, where the "center" of the wheels 127 orientation is the point that is equidistant from the maximum turning angles that wheels 127 are capable of turning. For example, if the wheels 127 are capable of turning 90° to left or the right from the normal, which is 0 degrees, then the "center" position for the orientation of the wheels' 127 are at the normal (i.e., 0°) and the "center" of the steering wheel 151 is the position that causes to the wheels 127 to be positioned at the normal. The concept of the "center" of the steering wheel 151 and the wheels 127 are described again detail in the disclosure.

In the illustrated example of FIG. 1, a center indicator control system that is implemented by the vehicle 120 can include, at least, the center indicator controller 160 and one or more center indicator devices 165. In an embodiment, the center indicator device(s) 165 can be implemented as light generating devices, such as LEDs, that can be disposed along the circumference (or perimeter in a non-circular steering wheel structure) of the steer wheel's 152 rim. For example, steering wheel 151 can have several center indicator devices 165 disposed thereon, which are implemented as a plurality of LEDs that are placed at various positions, at a short distance apart, along the perimeter of the steering wheel 151 which are visible to the driver when illuminated. For purposes of illustration, the center indicator devices 165 are described as light emitting devices, such as LEDs, but it should be appreciated that the center indicator devices 165 can be implemented as an output device that is capable of providing intelligible and recognizable feedback to the driver. According to the embodiments, the center indicator devices 165 can provide various types of feedback to the driver of the vehicle during operation, as deemed necessary or appropriate. The feedback can include a computer generated visual, audible, haptic, or tactile output that indicates the position on the steering wheel 151 that is the center position. Consequently, the center indicator controller 160 controls the selected center indicator device 165 to produce the appropriate feedback to the driver, such as light, sound, or vibration, which indicates the center position on the steering wheel 151. For example, the center indicator controller 160 can cause the steering wheel 151 to generate haptic touch, which vibrates the steering wheel 151 when the driver touches center position.

The center indicator controller 160 can be implemented as a vehicle controller, computing hardware, software, firmware, or a combination thereof, which is programmed to determine and indicate the center of the steering wheel 151, in accordance with the disclosed techniques. The center indicator controller 160 may be a standalone controller in some embodiments. Alternatively, the center indicator controller 160 may be implemented by configuring the main vehicle controller 125 (e.g., functions of the center indicator controller 160 integrated within the hardware of the vehicle controller 125). The center indicator controller 160 can be configured to determine the center position of the steering wheel 151, for example after the steering wheel has been temporarily decoupled/disconnected from the steering rack 152. As explained previously, this may occur when the vehicle 120 is performing an evasive maneuver by overriding the input of the driver.

In an embodiment, the center indicator controller 160 is configured to analyze vehicle data to determine the relationship between the orientation of the wheels 127 and the orientation of the steering wheel 151 in a manner the ultimately calculates the center of the steering wheel (e.g., position of the steering wheel that causes the wheels 127 to be aligned straight at 0° angle from a vertical Y axis). In some embodiments, the center indicator controller 160 is triggered to determine the center of the steering wheel 151 in response to detecting that the steering wheel 151 has been decoupled. Alternatively, the center indicator controller 160 is triggered to determine the center of the steering wheel 151 in response to detecting that the steering wheel 151 has been recoupled.

For example, the center indicator controller 160 can use data obtained by on-vehicle sensors in order to identify an orientation of the steering wheel 151, which can be determined as the degree of an angle that the steering wheel 151 is turned from a 0° vertical Y axis point (that can be a point that selected is on the steering wheel by the system) that corresponds to the degree of an angle that the wheels 127 are turned from a 0° from the vertical Y axis point.

For instance, the center indicator controller 160 is in communication with several sensors of the vehicle that can determine vehicle data, including, but not limited to: the speed and acceleration of the vehicle; road grip information; data from monitoring the braking system of the vehicle; road conditions data (e.g., ice, snow, rain, etc.); tire type; vehicle weight; vehicle center of gravity; and the like. This vehicle data is then utilized to determine the correspondence between the orientation of the steering wheel 151 to the orientation of the wheels 127, and subsequently identify the center of the steering wheel 151 which causes to the wheels 127 to be in the straight aligned position.

The center indicator controller 160 may also receive vehicle data from the steer-by-wire system 150, and is configured with the software, algorithms, and calculations necessary to accurately determine the center position of the steering wheel 151. Once the center position of the steering wheel 151 is determined by the center indicator controller 160, one of the center indicator devices 165 that is located at the position on the steering wheel 151 that corresponds to the determined center, is selected for illumination by the center indicator controller 160. Subsequently, the center indicator controller can send a control signal to the selected center indicator device 165, which can be an LED, to be illuminated to provide the driver with a visible and easily recognizable indication of the location for the center position of the steering wheel 151. Consequently, the driver simply can orient the steering wheel 151 based on the light of the center indicator device 165 to steer the vehicle 120. For example, the driver can turn the steering wheel 151 such that the illuminated center indicator device 165 is positioned directly at the top of the steering wheel 151 (e.g., 0° from the vertical Y axis point), and the driver can be assured that the wheels 127 are straightly aligned forward (e.g., 0° from the vertical Y axis point).

Figure 2:
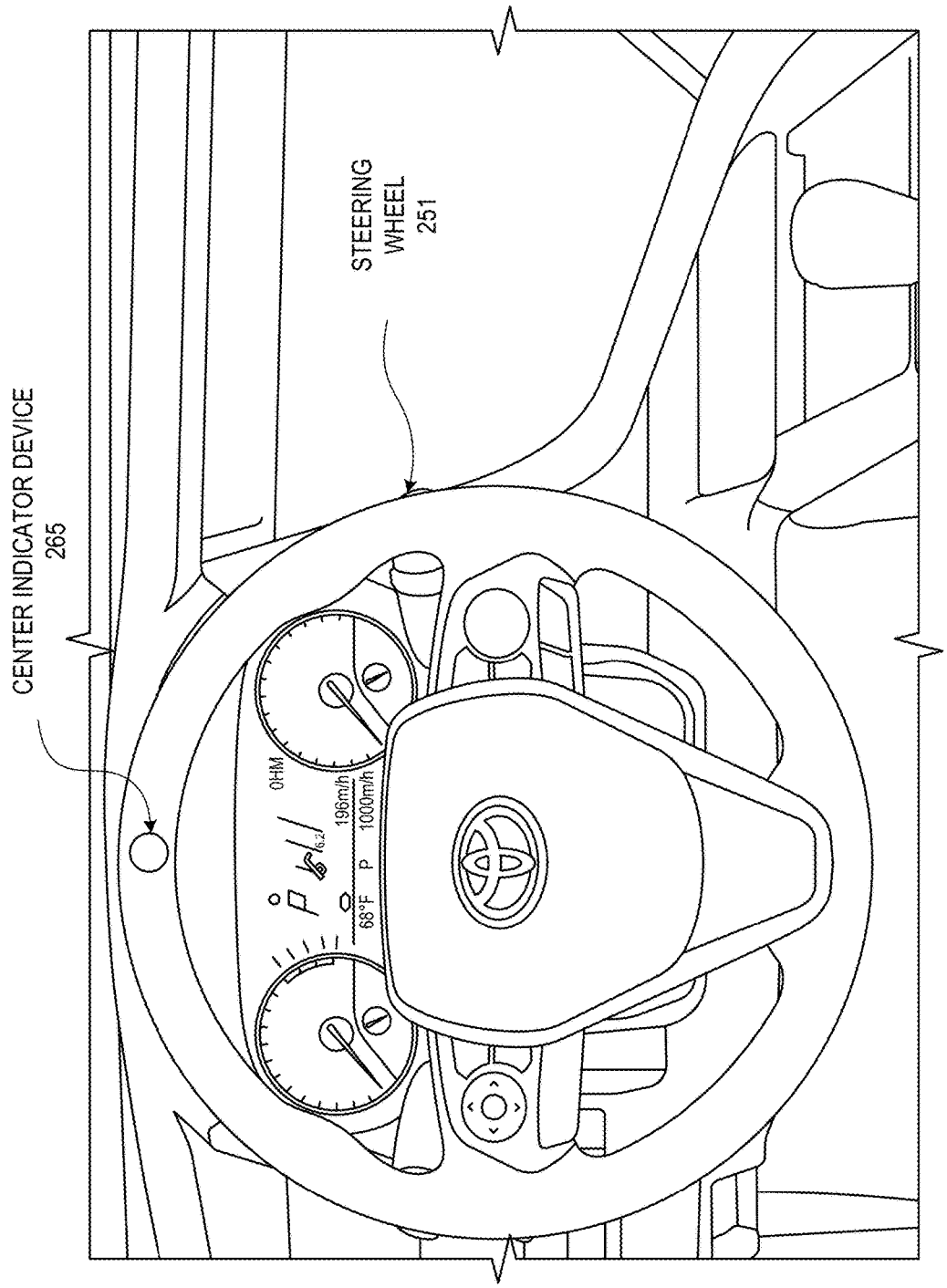
FIG. 2 is an example of a decouplable steering wheel of a vehicle implementing the center indicator controls, in accordance with an embodiment of the technology disclosed herein.

FIG. 2 illustrates an example of a steering wheel 251 of a vehicle that is implementing the center indicator control system, in accordance with the disclosed embodiments. Generally, the center position of the steering wheel 251 in the example of FIG. 1 is the nominal position common for steering wheels in the industry. Thus, FIG. 2 shows the center indicator device 265, which can be an LED or similar device, being illuminated on the steering wheel 251 at this nominal center position.

However, as alluded to above, there may be some situations where a steering wheel, such as steering wheel 251, is temporarily decoupled from the steering rack. As an example, the steering wheel 251 may be decoupled when steering control of the vehicle is relinquished from the driver to the computer-controlled capabilities of the safety system for autonomous maneuver. Recoupling of the steering wheel 251 to the steering rack may result in it being off-center, even when the wheels of the vehicle continue to be aligned straight (e.g., 0° angle from a vertical Y axis). An example of this scenario, when the steering wheel is recoupled in an off-centered orientation, is depicted in later figures. Currently, in many vehicles now in the market, the driver is forced to use more subjective and/or subtle visual cues to tell if the steering wheel 251 is generally in the center position, such as recognizing changes in the steering wheel's 251 shape, angle, and position. For example, the driver would typically be able to recognize that the steering wheel 251 is in the nominal center position based on the symmetry of the steering wheel 251 and knowledge regarding the correct orientation of the manufacturer logo. In contrast, the disclosed embodiments generate a more accurate, cognitive, and recognizable indictor, by triggering the center indicator device 265 at the computer-determined center of the steering wheel 251. As previously described, the center indicator device 265 will light as a visible cue to the driver, and remains illuminated (for a time period deemed appropriate), in order for the driver to understand the orientational relationship that corresponds the position of the steering wheel 251 to the position of the vehicle's wheels.

Figure 3:
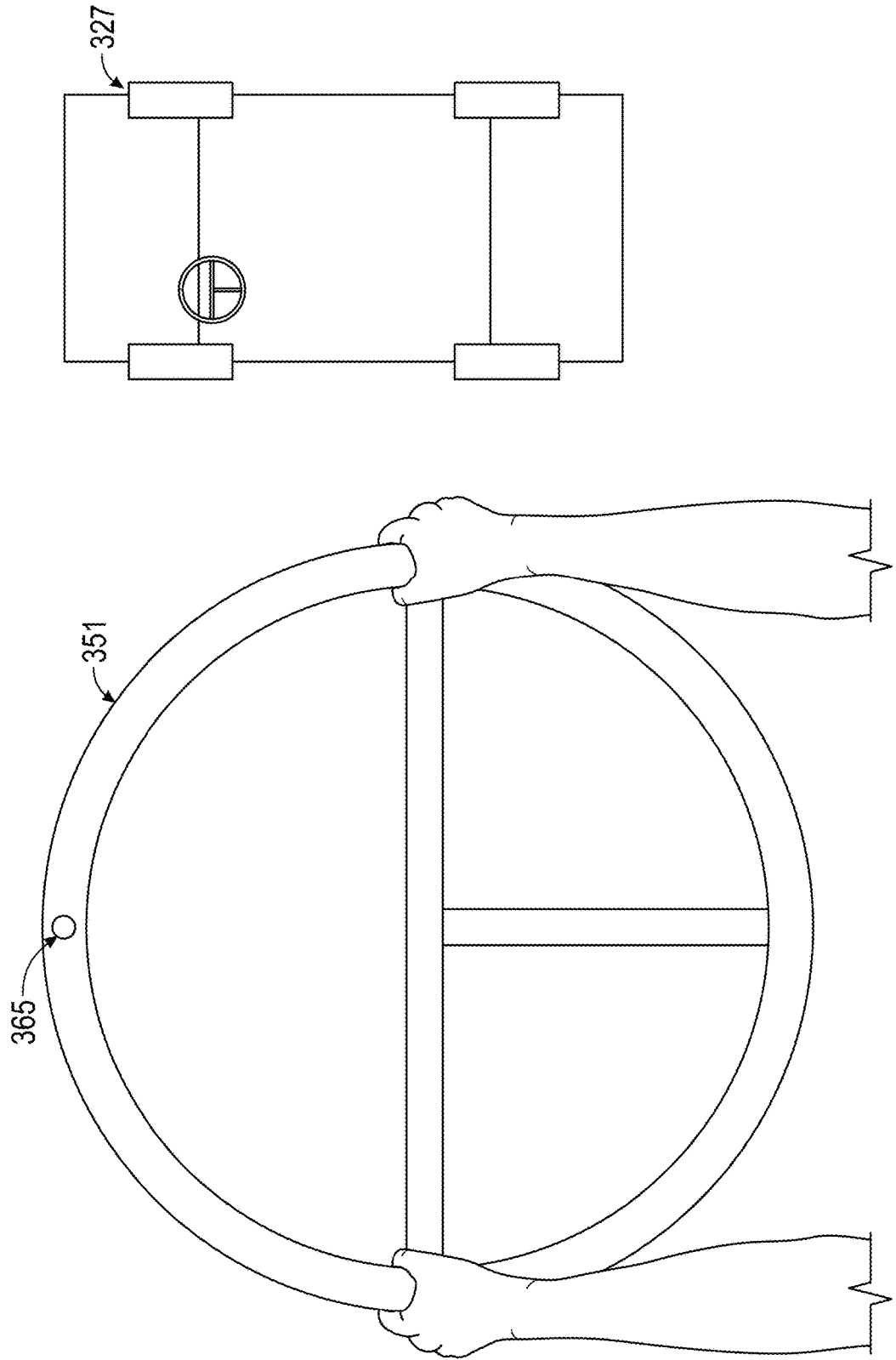
FIG. 3 depicts another example of a decouplable steering wheel implementing the center indicator controls, in accordance with an embodiment of the technology disclosed herein.

Referring now to FIG. 3, shows another example of the steering wheel 351 implementing the disclosed center indicator functions. In FIG. 3, the steering wheel is shown "centered" at its nominal center position in a manner similar to the example of FIG. 2. Conversely, a steering wheel is at a position that can be considered off-center, when it is turned at any angle (e.g., to the left, or to the right) away from this initial 12 o'clock position" in FIG. 3.

As illustrated by FIG. 3, the steering wheel 351 can be considered in the nominal center position, when the wheels 327 are vertically aligned straight (e.g., 0° angle from a vertical Y axis) and the steering wheel 351 is similarly vertically aligned straight (e.g., 0° angle from a vertical Y axis). Restated, the steering wheel 351 is at the nominal center position if it is oriented in its initial "12 o'clock position" (where the steering wheel is not turned to the right or left), and the vehicle traveling in a straight line.

Figure 4:
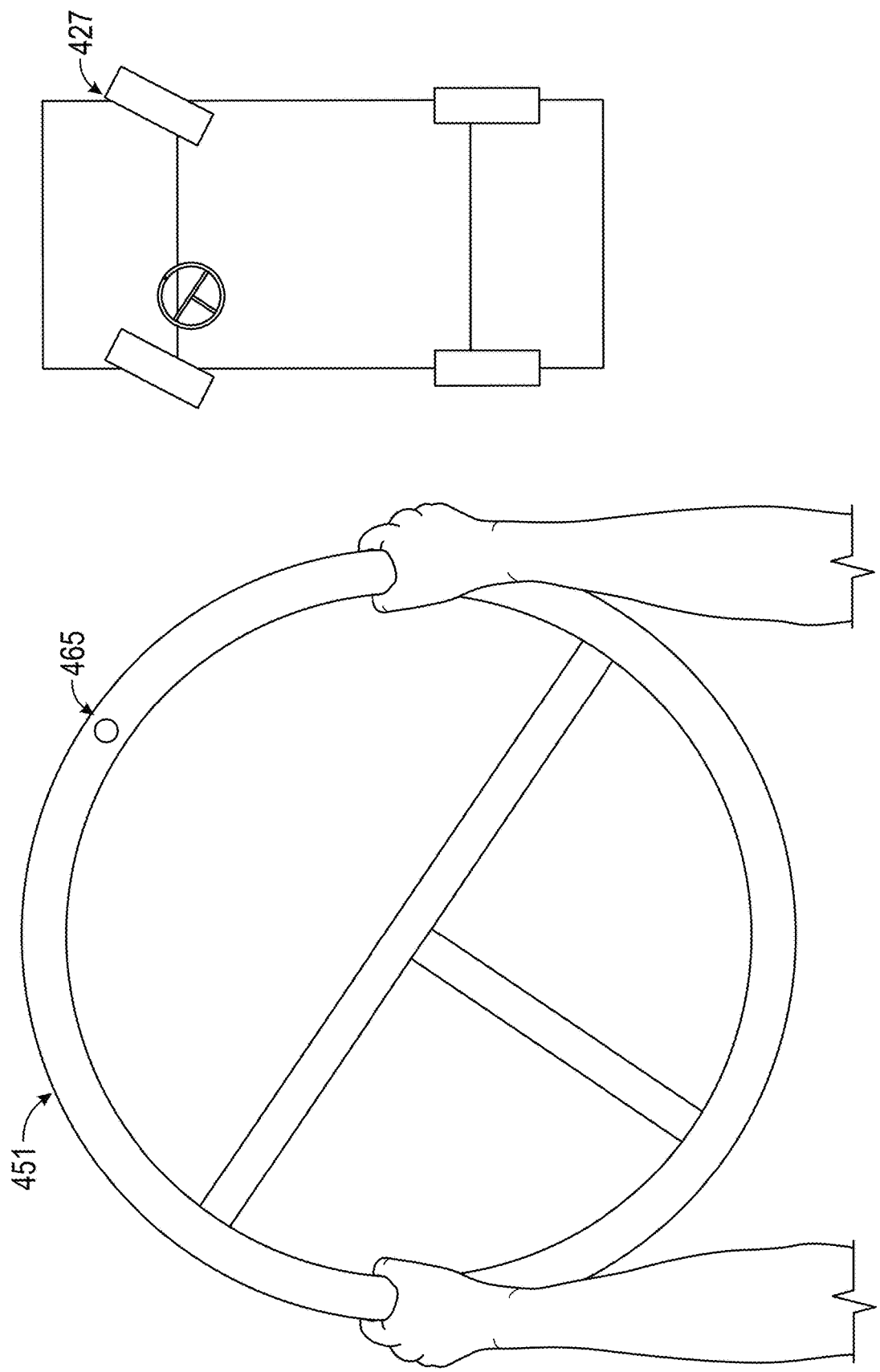
FIG. 4 depicts another example of a decouplable steering wheel implementing the center indicator controls, in accordance with an embodiment of the technology disclosed herein.

FIG. 4 illustrates an example where the steering wheel 451 still has its nominal center position as indicated by the illuminated center indicator device 465, but is currently being turned away from the previous "centered" orientation (shown in FIG. 3). As an example, the driver may turn the steering wheel 451 to the left, for instance, to also turn the wheels 427 to the left in order to steer the vehicle in this direction. In this example of FIG. 4, the steering wheel 451 can be described as being oriented at the "10 o'clock position." FIG. 4 particularly illustrates that even though the steering wheel 451 is not in the center position, the center, represented by the illuminated indication device 465 on the wheel has, not moved. Thus, the corresponding alignment between the wheels 427 and the steering wheel 451, as illustrated in FIG. 4, is maintained in a manner similar to the nominal center position. The example of FIG. 4 can illustrate a coupled scenario, wherein the steering wheel 451 is coupled/connected to the steering rack. As expected, as the wheels 427 of the vehicle turn to the right, the center position indicated by the LED, namely center indicator device 465 is unchanged. As such, the indicator at the same position on the steering wheel 451 stays illuminated as the center position of the steering wheel 451 remains unchanged, despite being turned.

Figure 5:
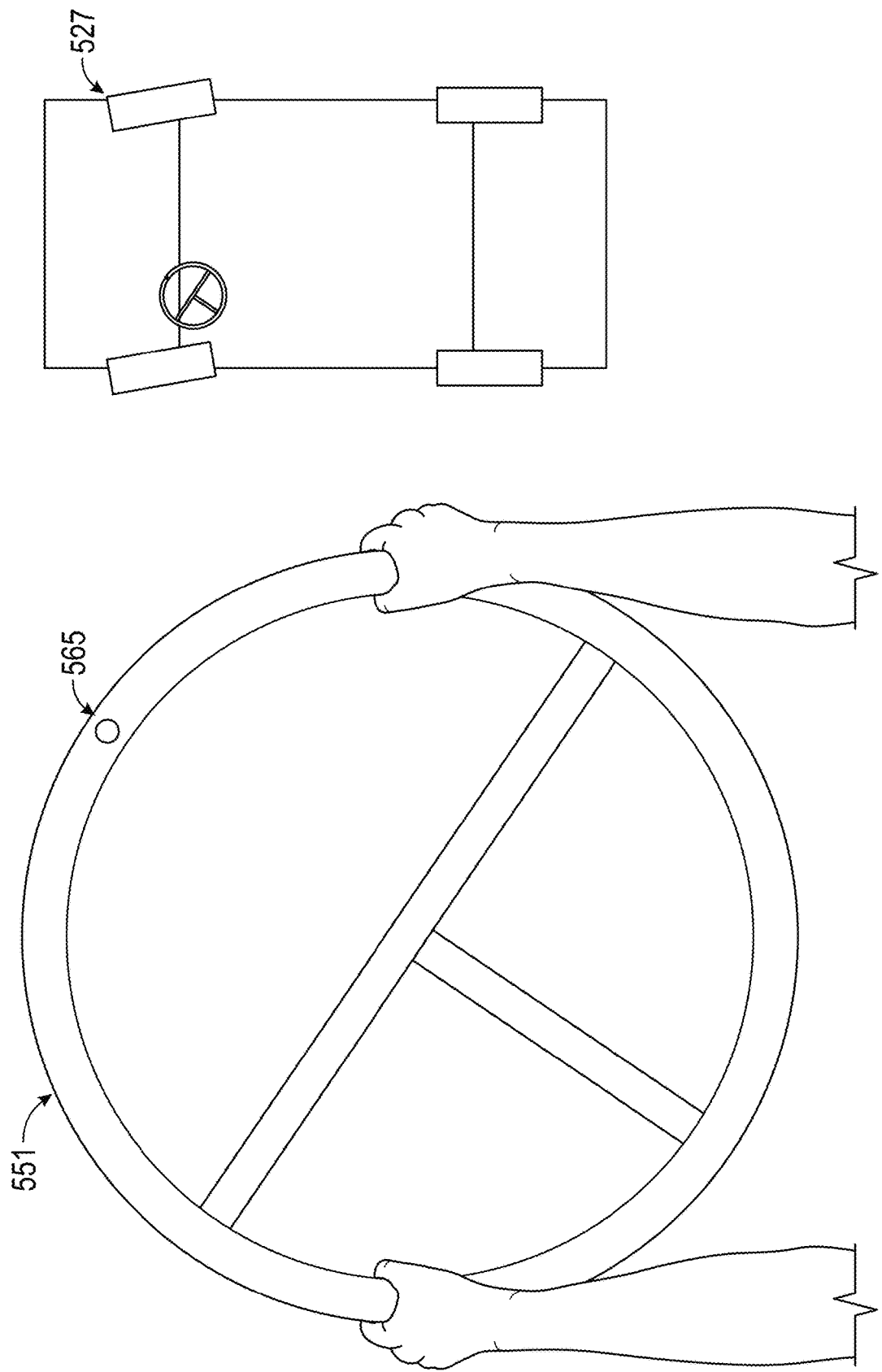
FIG. 5 depicts another example of a decouplable steering wheel in a decoupled state and implementing the center indicator controls, in accordance with an embodiment of the technology disclosed herein.

Referring now to FIG. 5, an example of a decoupled scenario for the steering wheel 551 is illustrated. For instance, as previously described, the steering wheel 551 may be decoupled/disconnected from the steering rack of the vehicle. Because the wheels 527 are not controlled by input from the steering wheel 551 while decoupled, FIG. 5 illustrates that the direct correspondence between the orientation of the steering wheel 551 and the orientation of the wheels 527 that is established with the nominal center position for the steering wheel 551 has been lost. As seen in FIG. 5, the steering wheel 551 is turned from the right of the center (e.g., positive angle from the y axis), which is indicated by the illuminated center indictor device 565 being to the right side in this orientation. However, the wheels 527 are turned to the left (e.g., negative angle from the y axis). That is, due to the independent movement of the wheels 527 that may occur during decoupling, for example under computer-controlled operation mode to perform a safety maneuver, there may be a new correspondence between the orientation of the wheels 527 and the orientation of the steering wheel 551, and in-turn a new center position for the steering wheel 551, that needs to be established after being recoupled.

Figure 6:
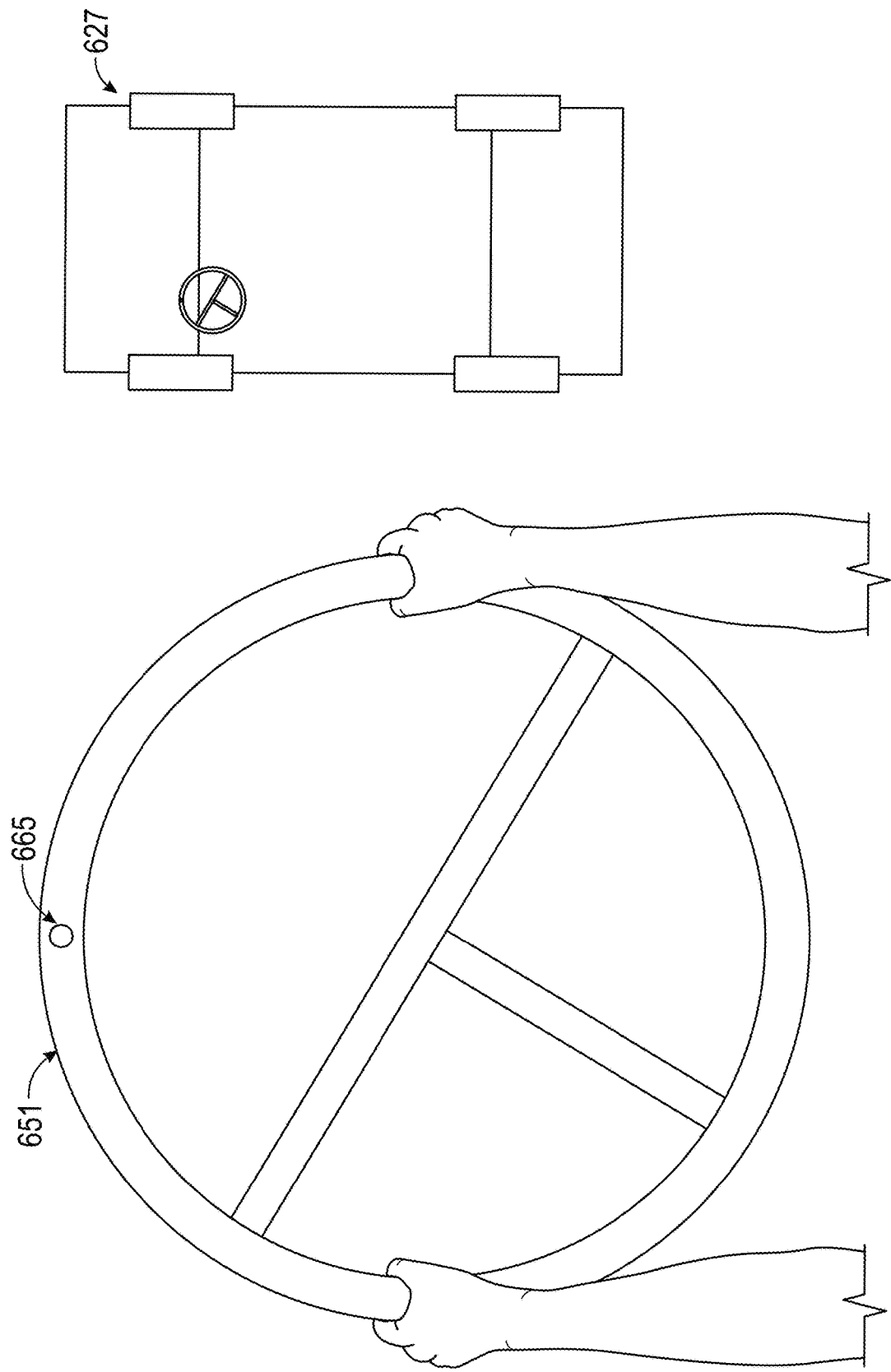
FIG. 6 depicts another example of a decouplable steering wheel in a recoupled state and implementing the center indicator controls, in accordance with an embodiment of the technology disclosed herein.

In FIG. 6, an example of a recoupled scenario for the steering wheel 651 is illustrated. Continuing with the example scenario, once the evasive maneuver has been performed, the steer-by-wire system may recouple/reconnect the steering wheel 651 to the steering rack. However, since the front wheels 627 have moved independent of the steering wheel 651, simply recoupling/reconnecting the steering wheel 651 to the steering rack may result in the steering wheel 651 appearing off-center when the wheels 627 of the vehicle are pointing forward. Thus, the disclosed center indicator control system can determine the new center position for the steering wheel 651, as described in detail above. Thus, a new center indicator device 665 that corresponds to the new center position on the steering wheel 651 can light-up to provide some indication to the driver of the center position of the steering wheel. In particular, FIG. illustrates that new center position for the steering wheel 651 after recoupling is not at the nominal center position, but is slightly to the left of this nominal orientation (shown in FIG. 3). As a result, the steering wheel 651 may appear to be turned to the right to the driver, based on the wheel's structure and nominal orientation. However, having the steering wheel 651 oriented such that the new illuminated center indicator device 665 is aligned at the top (0° from Y axis), will result in the wheels 627 being straightly aligned, thereby implementing the correspondence between the new center position for the steering wheel 651 and the position of the wheels 627.

Figure 7:
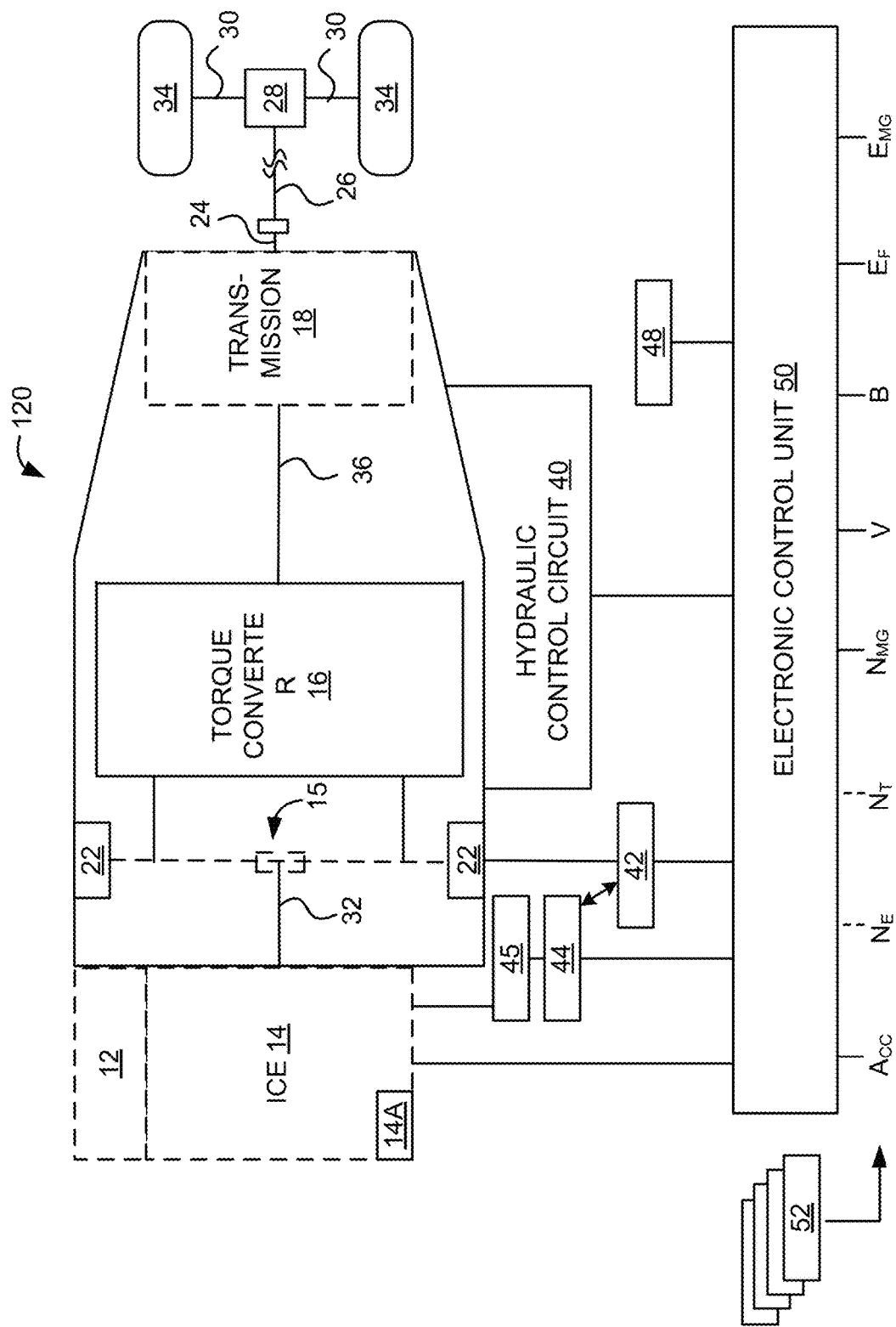
FIG. 7 is a schematic representation of an example vehicle with which embodiments of the center indicator control system disclosed herein may be implemented.

FIG. 7 illustrates a drive system of a vehicle 120 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

Vehicle 120 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be a hybrid electric vehicle (HEV) travel mode that uses engine 14 and the motor(s) 22 as the sources of motive power. In the engine-only and HEV travel modes, vehicle 120 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 120 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 120 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS, ESC, or regenerative braking system), battery management systems, and so on. These various control units can be implemented using two or more separate electronic control units or using a single electronic control unit.

In the example illustrated in FIG. 7, electronic control unit 50 receives information from a plurality of sensors included in vehicle 120. For example, electronic control unit 50 may receive signals that indicate vehicle operating conditions or characteristics, or signals that can be used to derive vehicle operating conditions or characteristics. These may include, but are not limited to accelerator operation amount, ACC, a revolution speed, NE, of internal combustion engine 14 (engine RPM), a rotational speed, NMG, of the motor 22 (motor rotational speed), and vehicle speed, NV. These may also include torque converter 16 output, NT (e.g., output amps indicative of motor output), brake operation amount/pressure, B, battery SOC (i.e., the charged amount for battery 44 detected by an SOC sensor). Accordingly, vehicle 120 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, EF, motor efficiency, EMG, hybrid (internal combustion engine 14+MG 12) efficiency, acceleration, ACC, etc.

Additionally, the one or more sensors 52 can be configured to detect, and/or sense position and orientation changes of the vehicle 120, such as, for example, based on inertial acceleration. In one or more arrangements, the electronic control unit 50 can obtain signals from vehicle sensor(s) including accelerometers, one or more gyroscopes, an inertial measurement unit (IMU), a dead-reckoning system, a global navigation satellite system (GNSS), a global positioning system (GPS), a navigation system, and/or other suitable sensors. In one or more arrangements, the electronic control unit 50 receives signals from a speedometer to determine a current speed of the vehicle 120.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output. Additionally, as alluded to above, the one or more sensors 52 can be configured to detect, and/or sense in real-time. As used herein, the term "real-time" means a level of processing responsiveness that a user or system senses as sufficiently immediate for a particular process or determination to be made, or that enables the processor to keep up with some external process.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 52 can be configured to acquire, and/or sense driving environment data. For example, environment sensors can be configured to detect, quantify and/or sense objects in at least a portion of the external environment of the vehicle 120 and/or information/data about such objects. Such objects can be stationary objects and/or dynamic objects. Further, the sensors can be configured to detect, measure, quantify and/or sense other things in the external environment of the vehicle 120, such as, for example, lane markers, signs, traffic lights, traffic signs, lane lines, crosswalks, curbs proximate the vehicle 120, off-road objects, etc.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 52 can be configured to acquire, and/or sense driving environment data. For example, environment sensors can be configured to detect, quantify and/or sense objects in at least a portion of the external environment of the vehicle 120 and/or information/data about such objects. Such objects can be stationary objects and/or dynamic objects. Further, the sensors can be configured to detect, measure, quantify and/or sense other things in the external environment of the vehicle 120, such as, for example, lane markers, signs, traffic lights, traffic signs, lane lines, crosswalks, curbs proximate the vehicle 120, off-road objects, etc.

Figure 8:
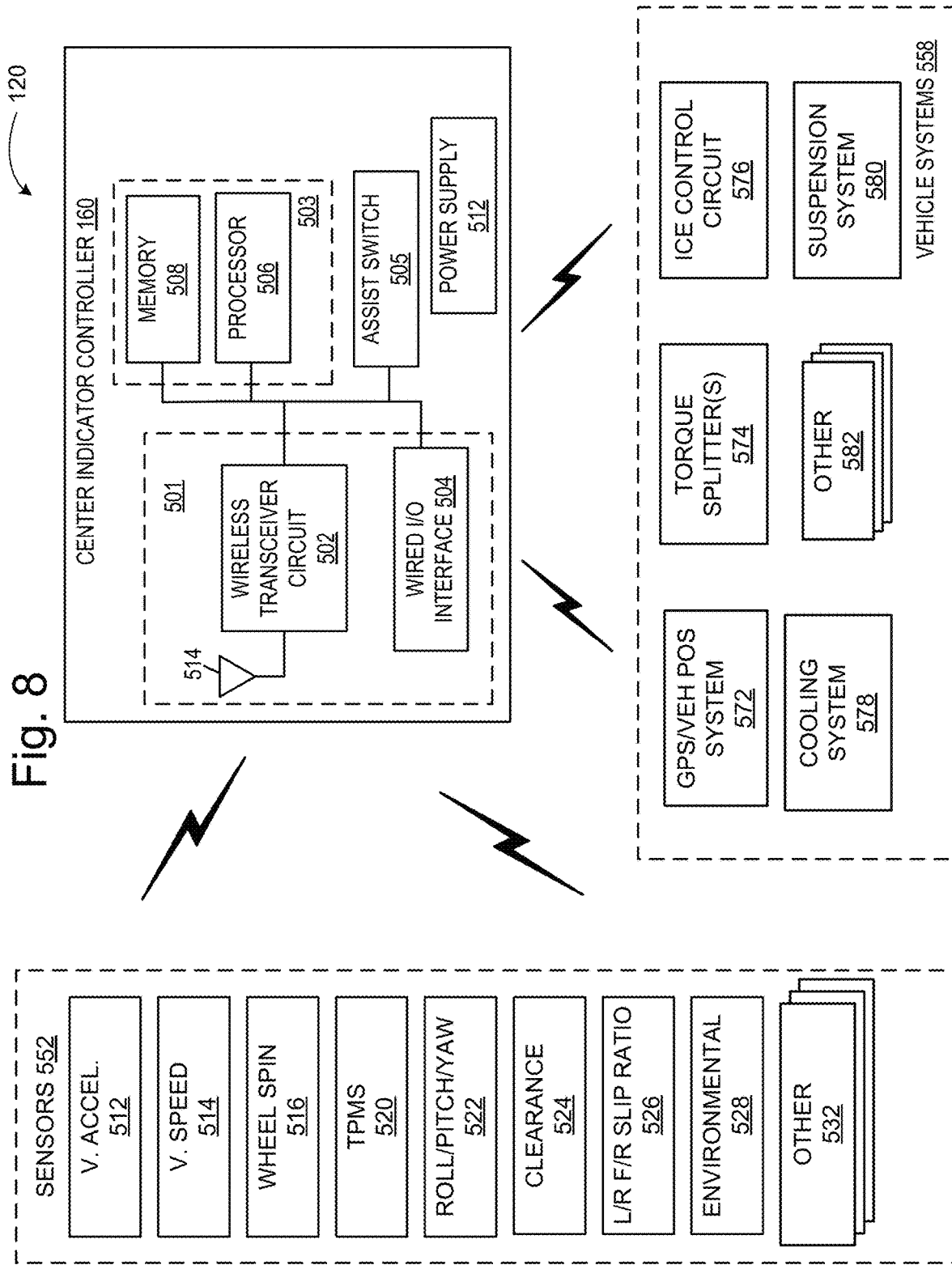
FIG. 8 illustrates an example communication architecture of the vehicle shown in FIG. 1, in accordance with one embodiment of the systems and methods described herein.

Although the example of FIG. 8 is illustrated using processor and memory circuitry, as described below with reference to circuits disclosed herein, center indicator controller 160 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up the center indicator controller 160.

Communication circuit 501 either or both a wireless transceiver circuit 502 with an associated antenna 514 and a wired I/O interface 504 with an associated hardwired data port (not illustrated). As this example illustrates, communications with center indicator controller 160 can include either or both wired and wireless communications circuits 201. In some embodiments, the communication circuit 501 may implement the IR wireless communications from the vehicle to a hydrogen fueling station. Wireless transceiver circuit 502 can include a transmitter and a receiver (not shown) to allow wireless communications via any of a number of communication protocols such as, for example, WiFi, Bluetooth, near field communications (NFC), Zigbee, IrDA, and any of a number of other wireless communication protocols whether standardized, proprietary, open, point-to-point, networked or otherwise. Antenna 514 is coupled to wireless transceiver circuit 502 and is used by wireless transceiver circuit 502 to transmit radio signals wirelessly to wireless equipment with which it is connected and to receive radio signals as well. These RF signals can include information of almost any sort that is sent or received by center indicator controller 160 to/from other entities such as sensors 552 and vehicle systems 558.

Wired I/O interface 504 can include a transmitter and a receiver (not shown) for hardwired communications with other devices. For example, wired I/O interface 504 can provide a hardwired interface to other components, including sensors 552 and vehicle systems 558. Wired I/O interface 504 can communicate with other devices using Ethernet or any of a number of other wired communication protocols whether standardized, proprietary, open, point-to-point, networked or otherwise.

Power supply 512 can include one or more of a battery or batteries (such as, e.g., Li-ion, Li-Polymer, NiMH, NiCd, NiZn, and NiH2, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 552 can include, for example, sensors 552 such as those described above with reference to the example of FIG. 2. Sensors 552 can include additional sensors that may or not otherwise be included on a standard vehicle with which the center indicator system is implemented. In the illustrated example, sensors 552 include vehicle acceleration sensors 512, vehicle speed sensors 514, wheelspin sensors 516 (e.g., one for each wheel), a tire pressure monitoring system (TPMS) 220, accelerometers such as a 3-axis accelerometer 522 to detect roll, pitch and yaw of the vehicle, vehicle clearance sensors 524, left-right and front-rear slip ratio sensors 526, and environmental sensors 528 (e.g., to detect salinity or other environmental conditions). Additional sensors 532 can also be included as may be appropriate for a given implementation.

Vehicle systems 558 can include any of a number of different vehicle components or subsystems used to control or monitor various aspects of the vehicle and its performance. In this example, the vehicle systems 558 include a GPS or other vehicle positioning system 572; torque splitters 574 they can control distribution of power among the vehicle wheels such as, for example, by controlling front/rear and left/right torque split; engine control circuits 576 to control the operation of engine (e.g. Internal combustion engine 14); cooling systems 578 to provide cooling for the motors, power electronics, the engine, or other vehicle systems; suspension system 580 such as, for example, an adjustable-height air suspension system, and other vehicle systems.

During operation, cooperative traffic congestion detection controller 525 can receive information from various vehicle sensors 552. Also, the driver may manually activate the cruise control mode by operating switch 505. Communication circuit 501 can be used to transmit and receive information between the cooperative traffic congestion detection controller 525 and sensors 552, and cooperative traffic congestion detection controller 525 and vehicle systems 558. Also, sensors 552 may communicate with vehicle systems 558 directly or indirectly (e.g., via communication circuit 501 or otherwise).

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Figure 9:
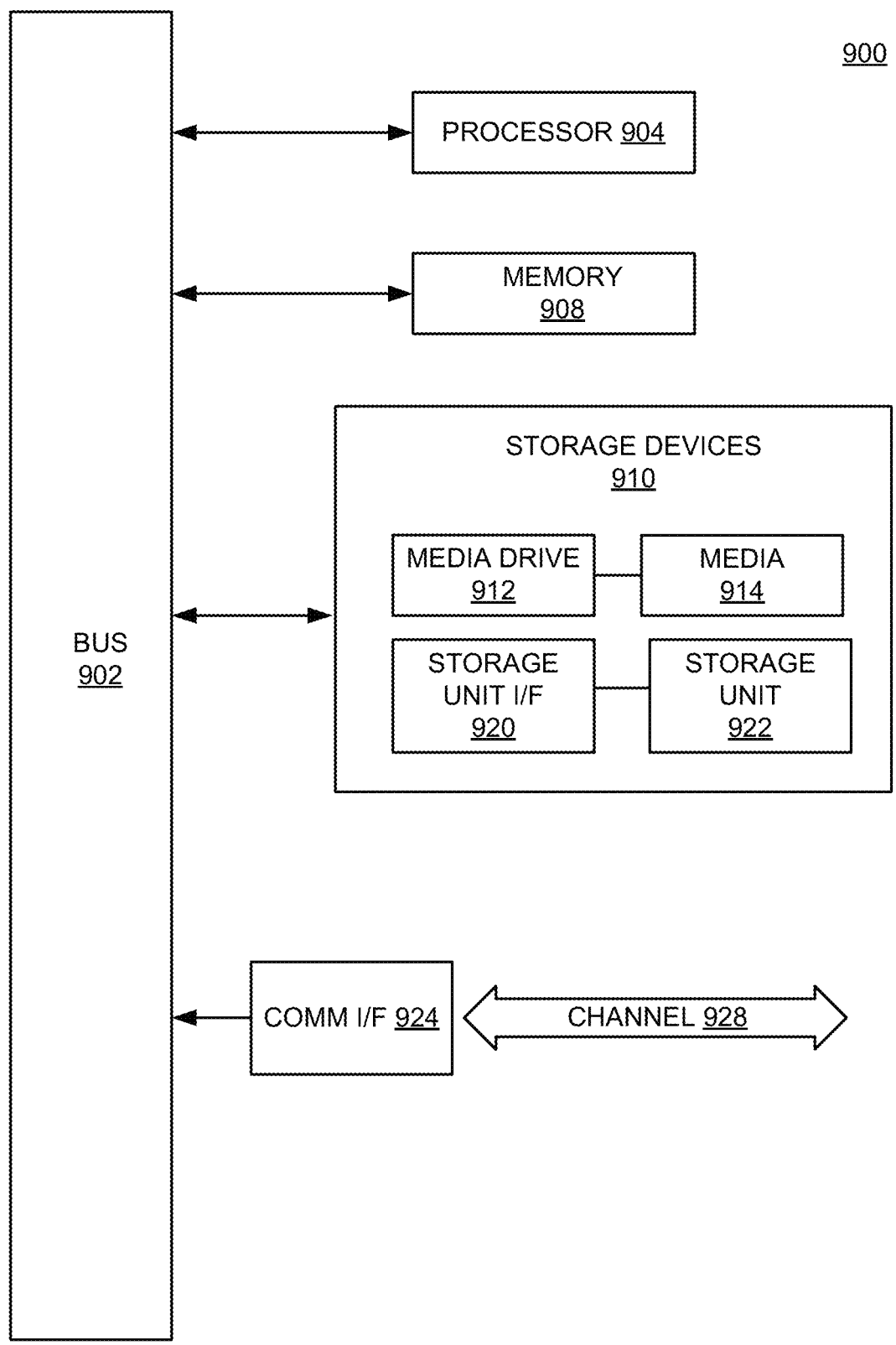
FIG. 9 is an example computing component that may be used to implement various features of embodiments described in the present disclosure.

Referring now to FIG. 9, computing component 900 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 900 might also represent computing capabilities embedded within or otherwise available to a given device. For example, a computing component might be found in other electronic devices such as, for example, portable computing devices, and other electronic devices that might include some form of processing capability.

Computing component 900 might include, for example, one or more processors, controllers, control components, or other processing devices. This can include a processor 904. Processor 904 might be implemented using a general-purpose or special-purpose processing engine such as, for example, a microprocessor, controller, or other control logic. Processor 904 may be connected to a bus 902. However, any communication medium can be used to facilitate interaction with other components of computing component 900 or to communicate externally.

Computing component 900 might also include one or more memory components, simply referred to herein as main memory 908. For example, random access memory (RAM) or other dynamic memory, might be used for storing information and instructions to be executed by processor 904. Main memory 908 might also be used for storing temporary variables or other intermediate information during execution of instructions to be executed by processor 904. Computing component 900 might likewise include a read only memory ("ROM") or other static storage device coupled to bus 902 for storing static information and instructions for processor 904.

The computing component 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a solid-state drive, a magnetic tape drive, an optical drive, a compact disc (CD) or digital video disc (DVD) drive (R or RW), or other removable or fixed media drive might be provided. Storage media 914 might include, for example, a hard disk, an integrated circuit assembly, magnetic tape, cartridge, optical disk, a CD or DVD. Storage media 914 may be any other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing component 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory component) and memory slot. Other examples may include a PCMCIA slot and card, and other fixed or removable storage units 922 and interfaces 920 that allow software and data to be transferred from storage unit 922 to computing component 900.

Computing component 900 might also include a communications interface 924. Communications interface 924 might be used to allow software and data to be transferred between computing component 900 and external devices. Examples of communications interface 924 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 924 may be carried on signals, which can be electronic, electromagnetic (which includes optical) or other signals capable of being exchanged by a given communications interface 924. These signals might be provided to communications interface 924 via a channel 928. Channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 900 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system comprising:
a plurality of center indicator devices, wherein the plurality of center indicator devices are disposed along a perimeter on a steering wheel of a vehicle; and
a controller, wherein the controller:
determines a position of the steering wheel that corresponds to a true center position on the steering when the steering wheel is out of alignment with steerable wheels of the vehicle, the true center position determination based on an analysis of vehicle data;

determines one of the plurality of center indicator devices that is at a position on the steering wheel that corresponds to the determined true center position on the steering wheel; and illuminates the determined center indicator device to produce feedback to a driver of the vehicle indicating the true center position on the steering wheel when the steering wheel is out of alignment with the steerable wheels of the vehicle.

2. The system of claim 1, wherein the controller is communicatively coupled to a steer-by-wire system of the vehicle.

3. The system of claim 2, wherein the steer-by-wire system of the vehicle is configured to decouple the steering wheel and to recouple the steering wheel.

4. The system of claim 3, wherein the controller determines the position on the steering wheel that corresponds to a center position on the steering wheel in response to decoupling the steering wheel or in response to recoupling the steering wheel.

5. The system of claim 4, wherein the controller determines the position on the steering wheel that corresponds to a center position on the steering wheel by analyzing vehicle data to calculate a position on the steering wheel that corresponds to wheels on the vehicle being aligned at a center position.

6. The system of claim 5, wherein the steer-by-wire system of the vehicle is configured to recouple the steering wheel after a computer-controller operational mode.

7. The system of claim 6, wherein the controller controls the determined center indicator device to produce feedback to the driver indicating the center position on the steering wheel after recoupling the steering wheel.

8. The system of claim 1, wherein the center indicator devices comprises Light Emitting Diodes (LEDs).

9. The system of claim 8, wherein the controller selects a LED at a position that corresponds to the determined center position on the steering wheel.

10. The system of claim 9, wherein the feedback to the driver indicating the center position on the steering wheel comprises light from the selected LED.

11. The system of claim 5, wherein the vehicle data is generated by one or more sensors of the vehicle.

12. The system of claim 11, wherein the vehicle data comprises one or more of:
speed and acceleration data, road grip information, braking system data, road conditions data, tire type, vehicle weight, and vehicle center of gravity.

13. The system of claim 5, wherein the controller determines the position on the steering wheel that corresponds to a center position on the steering wheel by determining a correspondence between an orientation of the steering wheel and an orientation of wheels on the vehicle.

14. The system of claim 1, wherein the true center position of the steering wheel is a new position of the steering wheel that corresponds to a center position of the steerable wheels when the steering wheel is out of alignment with steerable wheels of the vehicle.

15. The system of claim 14, wherein the center position of the steerable wheels of the vehicle corresponds to a 0° steer angle of the steerable wheels of the vehicle.

16. A non-transitory computer readable medium comprising instructions, that when read by a processor, cause the processor to perform:

determines a position on a steering wheel of a vehicle that corresponds to a true center position on the steering wheel when the steering wheel is out of alignment with steerable wheels of the vehicle, the true center position determination based on an analysis of vehicle data;

determines one of the plurality of center indicator devices that is at a position on the steering wheel that corresponds to the determined true center position on the steering wheel; and illuminates the determined center indicator device to produce feedback to a driver of the vehicle indicating the true center position on the steering wheel when the steering wheel is out of alignment with the steerable wheels of the vehicle.

17. The non-transitory computer readable medium of claim 16, comprising instructions that cause the processor to further perform:

analyze vehicle data to calculate a position on the steering wheel that corresponds to wheels on the vehicle being aligned at a center position, wherein the calculated position on the steering wheel corresponds to a center position on the steering wheel.

18. The non-transitory computer readable medium of claim 16, wherein the true center position of the steering wheel is a new position of the steering wheel that corresponds to a to a center position of the steerable wheels of the vehicle when the steering wheel is out of alignment with steerable wheels of the vehicle.

19. The non-transitory computer readable medium of claim 18, wherein the center position of the steerable wheels of the vehicle corresponds to a 0° steer angle of the steerable wheels of the vehicle.

* * * * *